INVENTOR.
KARL-HEINZ EISENMANN

United States Patent Office 3,585,680
Patented June 22, 1971

3,585,680
ARRANGEMENT FOR THE CONTINUOUS PRODUCTION OF SHAPED LENGTHS OF FOAM PLASTICS
Karl-Heinz Eisenmann, Bergisch-Neukirchen, Germany, assignor to Farbenfabriken Bayer Aktiengesellschaft, Leverkusen, Germany
Filed May 19, 1969, Ser. No. 835,282
Claims priority, application Germany, May 20, 1968,
P 17 78 651.5
Int. Cl. B29c *17/00*
U.S. Cl. 18—4
8 Claims

ABSTRACT OF THE DISCLOSURE

Apparatus suitable for continuous production of elongated shaped elements of foam plastics. A single jointed-band, endless conveyor having shaping mould elements mounted on the conveyor belt members is employed. The shaping mould elements each include a hinged section which is guided into and out of the moulding position along one flight of the conveyor.

---

The present invention relates to an arrangement for the continuous production of shaped lengths of foam plastics, more especially of circular cross-section, by means of a foaming arrangement with jointed-band conveyers, suitable shaping mould elements being arranged on the sections of the conveyors.

Such shaped lengths are for example produced from the chemical point of view on the basis of polyurethanes, polystyrene or polyvinylchloride.

One arrangement is known in which shaping mould elements which face one another are arranged on two synchronously running conveyor belts, it being possible for circular cross-section foam plastic element to be continuously produced between said mould elements. The disadvantage of this arrangement is that two conveyor belts are provided, and these have to run with absolute synchronism in order to avoid internal stresses in the corresponding shaped element.

THE INVENTION

It has now been found that these disadvantages are to be overcome by the shaping mould elements all being arranged on a single conveyor belt, each of these shaping mould elements consisting of a rigid mould component which is fixed on the conveyor belt and on each of which is arranged at least one hinged mould section. The effect hereby obtained is that the endless, revolving conveyor belt carries all the shaping mould elements and the hinged mould sections of the latter are so guided that a casing or mould is formed, which can be progressively opened section by section for the purpose of discharging the round-section element, so that the completely foamed shaped element can be detached or discharged from the conveyor belt without any difficulties. According to whether it is a complicated or less complicated element which is involved, it is possibly sufficient to have a single hingeable mould section for each shaping mould element. It is however advantageous to use two hingeable mould sections, since by this means the uncovering of the element can be effected more easily.

According to one particular embodiment of the invention, the hingeable mould sections are provided with guide means with which guide rails are associated. Suitable for this purpose are, for example, open eyes or hooks which are arranged on the hingeable mould sections and which partially enclose the guide rails. The guide rails themselves are at the same time made so stable by suitable supports that they not only guide the hingeable mould sections for the purpose of enclosing and uncovering the shaped element, but also support the mould sections against the foaming pressure.

However, for taking up the foaming pressure, it is also possible to provide one or more special rails, which bear against the outsides of the hingeable mould sections, at least in the region where the foaming pressure is set up.

In order to avoid any formation of gas inside the foaming chamber which would have a disadvantageous influence on the shape of the moulded element, each of the mould sections is perforated, or they consist of porous, air-permeable and gas-permeable material, according to one particular development of the invention. According to an equivalent constructional form, the hingeable mould sections do not completely enclose the shaped element to be foamed, but leave the highest point of the foaming chamber free, so that the gas can discharge freely from this opening. It is understood that a paper web or other foils can be caused to run into the conveyor belt in a manner known per se, the foamable mixture being applied to said web or foils. The advantage consists in that the shaping mould elements are not soiled by reaction mixture adhereing thereto. In addition, an impression of the separating lines between the individual belt sections on the foamed shaped element is avoided by the covering foil.

The shaping mould elements are in advantagous manner arranged to be replaceable. Depending on the nature of the shaped elements to be foamed, it is often merely sufficient to exchange the hingeable mould sections. As a result of this interchangeability, it becomes possible for the arrangement to be used for foaming shaped elements of various cross-sections, without relatively large conversions being necessary. The cross-section of the shaped element can also optionally be altered by additional mould sections being arranged internally on the shaping mould elements. This can for example be of particular advantage when the shaped element is for example to have a periodically repeating honeycomb or stud structure on the surface.

Thus the invention provides apparatus suitable for continuous production of elongated shaped elements of foam plastic. The apparatus includes only one jointed-band, endless conveyor composed of linked conveyor belt members, having an upper flight and a lower flight. At least one shaping mould element is mounted on the outwardly disposed side of each belt member. Each shaping mould element includes a fixed section fixedly secured to its belt member and a hinged section hinged on the fixed section. The hinged section is movable from an open position permitting insertion and discharge of, respectively, moulding material and the moulded product, and a closed position defining the mould cavity. In the closed position, adjacent mould elements are in abutting relation. Guide means are provided for guiding the mould elements to the closed position as they move onto and over one flight of the conveyor and to the open position as they move off said flight. Further, means are provided for depositing foamable material in the mould elements as the mould elements move onto the flight over which the moulding is performed. Said guide means can be a rail in sliding surface contact with the hinged sections.

One embodiment of the arrangement is shown by way of example and in diagrammatic form in the drawing, wherein.

Figure 1:
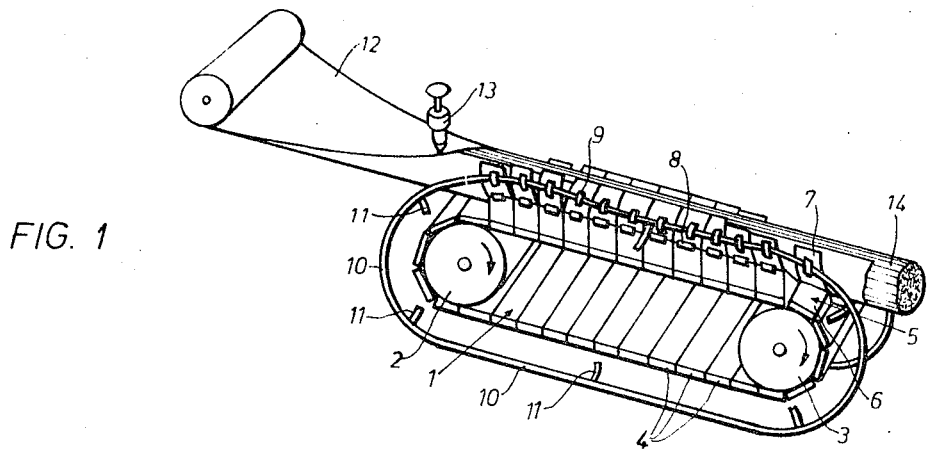
FIG. 1 is a perspective view of the arrangement in operation.

In FIG. 1, fixed on an endless jointed-band conveyor 1, which runs around guide rollers 2 and 3, and on separate sections 4 of this conveyor, are shaping mould elements 5. These consist of rigidity fixed mould sections 6, on which hingeable mould sections 7 are held by means of hinges 8. Hooks 9 arranged on the hingeable mould sections 7 travel on guide rails 10, which are held by means of indicated supports or stays 11.

The shaping mould sections 5 are closed at the supply end of the conveyor belt 1 and enclose a supporting and covering foil 12, onto which the foamable liquid reaction mixture is applied by means of an injection head 13. After the foaming operation, a continuous shaped length 14 is automatically discharged at the delivery end of the conveyor belt 1, and can be carried away.

Figure 2:
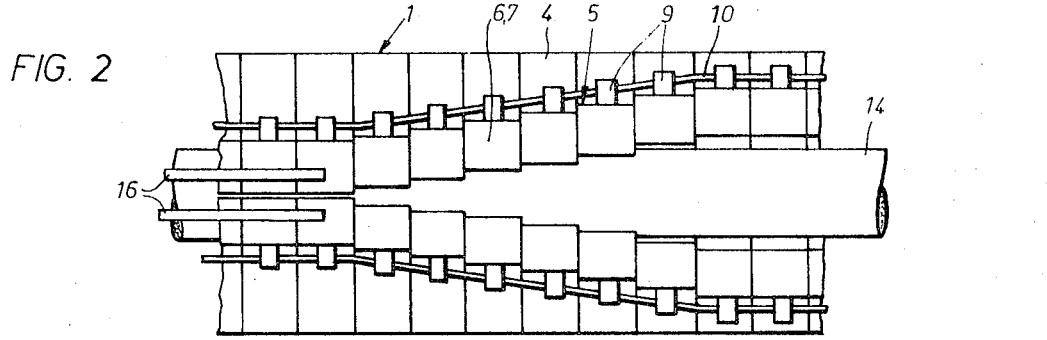
FIG. 2 shows the arrangement in plan view.
Figure 3:
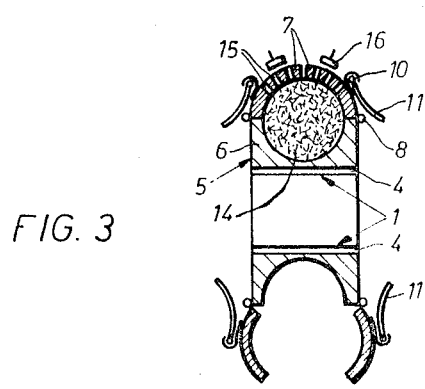
FIG. 3 shows the arrangement in cross-section.

Whereas the hingeable mould sections 7 shown in FIGS. 1 and 2 do not completely close, in order to allow the gas which is evolved to escape, FIG. 3 shows an alternative solution, in which the hingeable mould sections 7 close completely, but are provided with a plurality of air-venting bores 15.

In FIGS. 2 and 3, there are also shown auxiliary rails 16 for taking up the foaming pressure, said rails extending over that region of the conveyor belt 1 in which the shaping mould sections 5 are closed.

What is claimed is:

1. Apparatus suitable for continuous production of elongated shaped elements of foamed plastic comprising:
   (a) only one jointed-band, endless conveyor composed of linked conveyor belt members, having an upper flight and a lower flight,
   (b) at least one shaping mould element mounted on the outwardly disposed side of each belt member, each shaping mould element comprising a fixed section fixedly secured to its belt member and a hinged section hinged on the fixed section,
   (c) the hinged section being movable from an open position permitting insertion and discharge of, respectively, moulding material and the moulded product, and a closed position, defining the mould cavity, adjacent mould elements in the closed position being in abutting relation, and
   (d) guide means for guiding the mould elements to the closed position as they move onto and over one flight of the conveyor and to the open position as they move off said one flight.

2. Apparatus according to claim 1, and means for depositing foamable material in the mould elements as the mould elements move onto said one flight.

3. Apparatus according to claim 2, said guide means comprising a rail in sliding surface contact with the hinged sections.

4. Apparatus according to claim 1, said guide means comprising a rail in sliding surface contact with the hinged sections.

5. Apparatus according to claim 4, the hinged sections being perforated.

6. Apparatus according to claim 4, each mould element comprising two cooperating fixed sections each having a hinged section mounted thereon, the guide means moving the mould elements to the closed position on the upper flight, the upper ends of the hinged sections of each mould element being spaced from each other with the mould element in the closed position.

7. Apparatus according to claim 1, the mould elements being removably mounted on the belt members.

8. Apparatus according to claim 1, the hinged sections being removably mounted on the belt members.

References Cited
UNITED STATES PATENTS

| | | | |
|---|---|---|---|
| 3,048,888 | 8/1962 | Shockle et al. | 18—4X |
| 3,286,305 | 11/1966 | Seckel | 18—19 |
| 3,382,303 | 5/1968 | Stieg | 18—4X |
| 3,488,800 | 1/1970 | Kornylak | 18—4 |

FRANK T. YOST, Primary Examiner

U.S. Cl. X.R.

18—19, 21